United States Patent [19]

Churm et al.

[11] Patent Number: 4,922,417

[45] Date of Patent: May 1, 1990

[54] METHOD AND APPARATUS FOR DATA HASHING USING SELECTION FROM A TABLE OF RANDOM NUMBERS IN COMBINATION WITH FOLDING AND BIT MANIPULATION OF THE SELECTED RANDOM NUMBERS

[75] Inventors: Brian R. Churm, Wheaton; Michael E. Diesel, Newark, both of Ill.

[73] Assignee: American Telephone and Telegraph Company, New York, N.Y.

[21] Appl. No.: 922,875

[22] Filed: Oct. 24, 1986

[51] Int. Cl.$^5$ .............................................. G06F 15/40
[52] U.S. Cl. ................................. 364/200; 364/259.8; 364/282.1; 364/255.7
[58] Field of Search ... 364/200 MS File, 900 MS File

[56] References Cited

U.S. PATENT DOCUMENTS

| | | | |
|---|---|---|---|
| 3,902,163 | 8/1975 | Amdahl et al. | 364/200 |
| 4,155,119 | 5/1979 | De Ward et al. | 364/200 |
| 4,163,280 | 7/1979 | Mori et al. | 364/200 |
| 4,170,039 | 10/1979 | Beacom et al. | 364/200 |
| 4,173,783 | 11/1979 | Couleur et al. | 364/200 |
| 4,215,402 | 7/1980 | Mitchell et al. | 364/200 |
| 4,277,826 | 7/1981 | Collins et al. | 364/200 |
| 4,290,105 | 9/1981 | Cichelli et al. | 364/200 |
| 4,297,743 | 10/1981 | Appell et al. | 364/200 |
| 4,319,336 | 3/1982 | Anderson et al. | 364/200 |
| 4,385,352 | 5/1983 | Bienvenu | 364/200 |
| 4,418,275 | 11/1983 | Oosterbaan et al. | 377/33 |
| 4,450,522 | 5/1984 | Pilat et al. | 364/200 |
| 4,466,056 | 8/1984 | Tanahashi | 364/200 |
| 4,471,431 | 9/1984 | Vogt | 364/200 |
| 4,472,774 | 9/1984 | Picat et al. | 364/200 |
| 4,564,944 | 1/1986 | Arnold et al. | 364/200 |
| 4,591,972 | 5/1986 | Guyer et al. | 364/200 |
| 4,602,328 | 7/1986 | Finger et al. | 364/200 |
| 4,780,816 | 10/1988 | Connell | 364/200 |

OTHER PUBLICATIONS

Lum et al., "Key-to-Address Transform Techniques: A Fundamental Study on Large Existing Formatted Files", Communications of the ACM, vol. 14, No. 4, pp. 228-239, Apr. 1971.
Knott, G. D., "Hushing Functions", The Computer Journal, vol. 18, No. 3, pp. 265-277, 1975.
R. P. Brent, "Reducing the Retrieval Time of Scatter Storage Techniques", Communications of the ACM, vol. 16, No. 2, Feb. 1973, pp. 105-109.
A. V. Aho et al., "Hash Tables", Compilers, Principles, Techiques, and Tools, Addison-Wesley, Dec. 1985, pp. 433-438.
R. Morris, "Scatter Storage Techniques", Communications of the ACM, vol. 11, No. 1, Jan. 1968, pp. 38-44.
M. D. McIlroy, "Development of a Spelling List", IEEE Transactions on Communications, vol. Com-30, No. 1, Jan. 1982, pp. 91-99.
L. J. Guibas, "Hashing Techniques that Exhibit Secondary or Tertiary Clustering", Second USA-Japan Computer Conference Proceedings, Aug. 1975, pp. 324-328.
D. E. Knuth, "Hashing", The Art of Computer Programming, Addison-Wesley Publishing Co., Inc., 1973, pp. 506-549.

Primary Examiner—Thomas M. Heckler
Attorney, Agent, or Firm—Ross T. Watland

[57] ABSTRACT

A data hashing arrangement particularly suitable for efficient database storage and fast retrieval of large numbers of character strings. A database address is determined for a character string by replacing individual characters with random numbers selected from a predefined table of random numbers. The table locations of the selected random numbers are uniquely defined by the characters. The selected numbers are combined by iterative bit reordering and exclusive-OR operations to form a result, which is then used to derive the database address where the character string is stored.

10 Claims, 3 Drawing Sheets

METHOD AND APPARATUS FOR DATA HASHING USING SELECTION FROM A TABLE OF RANDOM NUMBERS IN COMBINATION WITH FOLDING AND BIT MANIPULATION OF THE SELECTED RANDOM NUMBERS

TECHNICAL FIELD

This invention relates to arrangements for data storage and retrieval and particularly to data hashing techniques associated with scatter storage tables.

BACKGROUND OF THE INVENTION

Data are commonly stored in a database in a relation or table where rows in the table are called tuples and columns are attributes having unique names. A name attribute in a specific tuple is referred to as an item. A key is a subset of attributes whose values are used to uniquely identify a tuple.

One method for storing and retrieving tuples involves ordering the tuples sequentially based on their keys, for example, in alphabetical or numerical order. However, the best technique of searching for a tuple in a sorted table requires at least an average of $\log_2 M$ probes, where M is the size of the table. For example, an average of at least 10 probes are required to find a tuple in a table having 1024 entries. One can do much better than this using a table referred to as a scatter storage table.

The fundamental idea behind scatter storage is that the key associated with the desired tuple is used to locate the tuple in storage. Some transformation is performed on the key to produce the database address where the tuple is stored. Such transformations are referred to as "hash functions" and the data storage and retrieval procedures associated with scatter storage are known as data hashing. A good hash function is one that spreads the calculated addresses uniformly across the available addresses. If a calculated address is already filled with another tuple because two keys happen to be transformed into the same address, a method of resolving key collisions is used to determine where the second tuple is stored. For example, with a known method referred to as linear probing, the second tuple is stored at the next available address.

A number of hash functions have been developed for transforming keys comprising character strings. Such functions are useful, for example, in hashing symbol tables for computer program compilers and typically form various numerical or logical combinations of bits representing the string characters to determine a positive integer. The database address is then derived as a function of the positive integer. For example, the database address may be obtained by dividing the positive integer by a constant and taking the remainder. However, with known hash functions, patterns in the data frequently result in a significant clustering of data rather than a uniform distribution. When the data are stored in pages on a disk, the clustering can result in many tuples being stored on overflow pages other than those defined by the calculated addresses. This leads to slow data access since retrieving particular tuples will frequently require more than one disk access operation. Increasing the total available storage such that the data are more sparsely packed can improve data access times but only at substantial expense.

In view of the foregoing, a recognized problem in the art is the clustering of data that occurs when character strings are hashed by performing manipulations and combinations of the individual characters.

SUMMARY OF THE INVENTION

The foregoing problem is solved and a technical advance is achieved in accordance with the principles of the invention in an exemplary data hashing arrangement where the characters of a character string are advantageously replaced by numbers selected from a predetermined table of numbers at table locations uniquely defined by the characters. A data hashing arrangement using this technique allows uniformly distributed database addresses to be derived even if the data are highly patterned, thus allowing data to be relatively densely packed in the database while still achieving fast data access.

A method in accordance with the invention determines a database address for a data item comprising N data units, where N is a positive integer greater than one, by selecting numbers from a predefined table of numbers at table locations determined from the N data units. The selected numbers are combined to form a result and the database address is then derived as a predetermined function of the result.

In the preferred embodiment, the data item is a tuple key and the data units are characters each represented by an eight-bit byte encoded according to the well-known ASCII code. Each character is replaced by the number stored at the table location defined by the ASCII representation of that character. Significantly, the numbers in the predefined table of numbers are independent of the characters of the key, i.e., they cannot be derived therefrom by predetermined manipulations. The numbers in the predefined table are statistically random.

The selected numbers are combined by initializing a register, reordering the bits in the register, generating a combination of one of the selected numbers with bits in the register, storing the combination in the register, and then repeating the reordering, generating, and storing steps for each of the selected numbers. The database address is derived by dividing the result formed in the register by a positive integer and taking the remainder. In the preferred embodiment, the bit reordering step comprises a circular shift of the register bits and the generated combinations are exclusive-OR combinations.

DRAWING DESCRIPTION

DETAILED DESCRIPTION

Figure 1:
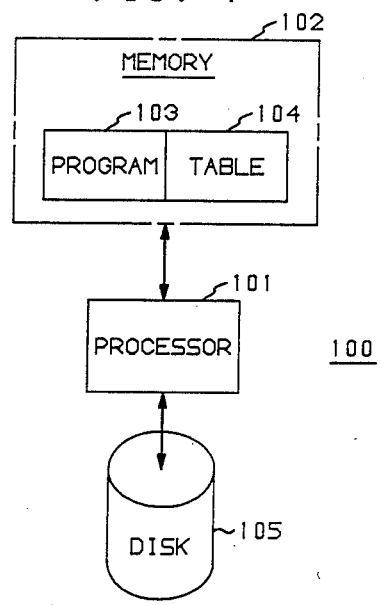
FIG. 1 is a block diagram of a computer system implementing an exemplary data hashing method in accordance with the invention.

An exemplary hashing arrangement in accordance with the invention is used for data storage and retrieval of a relation of a disk 105 (FIG. 1). Disk 105 is included as part of computer system 100 which operates as the system central control in a telephone switching system.

The key for the relation is an authorization code comprising a character string of 15 ASCII characters. Each tuple of the relation also includes information defining one of a set of possible dialing privileges. When a customer enters his or her assigned authorization code from a station set (not shown), a processor 101 of computer system 100 executes a program stored in a program block 103 of a memory 102 to determine the database address where the tuple identified by the entered authorization code is stored on disk 105. As is described herein, execution of the program involves the selection of random numbers from a table of random numbers stored in a table block 104. If the identified tuple is present in the relation stored on disk 105, the tuple is read by processor 101 to determine, for example, whether the customer can originate a telephone call from that station set.

Figure 2:
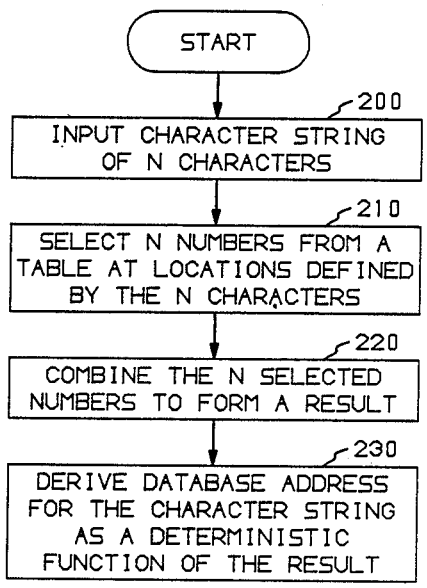
FIG. 2 is a high-level flow diagram of a database address generation program used in the computer system of FIG. 1.

A high level flow diagram of the database address generation program stored in program block 103 is shown in FIG. 2. The program makes use of a table of 31-bit random numbers shown in abbreviated form in Table I. The complete table is included in the program of Appendix A.

TABLE I

| TABLE OF RANDOM NUMBERS | |
|---|---|
| Location | Number |
| 0 | 0x32bf5692 |
| 1 | 0x66950646 |
| . . | . |
| . | . |
| 255 | 0x604ae8a |

The table has a 31-bit random number stored at each of 256 table locations. The 31-bit random numbers are shown in Table 1 and Appendix A in hexadecimal form. Execution of the program begins with block 200 during which the character string of N characters is stored, N being a positive integer greater than one. In the present example N is 15. During block 210, 15 random numbers are selected from the table of random numbers, one from each location defined by a character of the string. During block 220, the 15 random numbers are combined to form a result. Then during block 230, the database address for the character string is derived as a deterministic function of the result.

Figure 3:
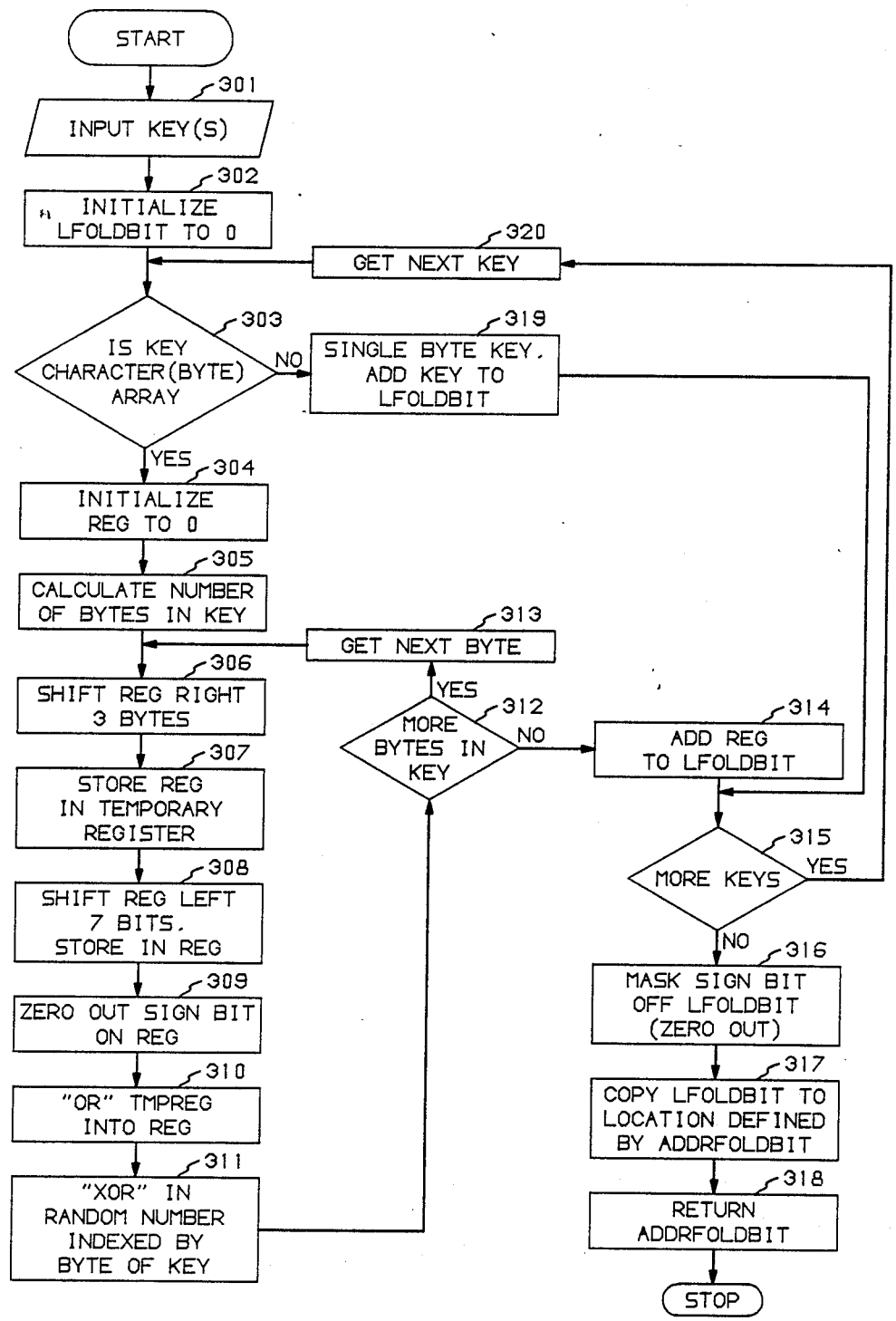
FIG. 3 is a more detailed flow diagram of a portion of the database address generation program used in the computer system of FIG. 1.

A more detailed flow diagram of a portion of the database address generation program is shown in FIG. 3. The portion of the program shown in FIG. 3 would replace blocks 200, 210 and 220 of FIG. 2. Execution begins with block 301, where one or more keys are entered. Assume initially that a single key comprising 15 ASCII characters is entered, where each character is represented by an eight-bit byte. Execution proceeds to block 302 where a variable lfoldbit is initialized to zero. Execution then proceeds to decision block 303 where a branch is made depending on whether the key is a character array or a single character. Consistent with the assumption of a character array of 15 characters or bytes, execution proceeds from decision block 303 to block 304 where a variable reg is initialized to zero, and then to block 305 where the number of bytes in the key is calculated. The variable reg comprises 32 bits including an initial sign bit. The sequence of blocks 306, 307, 308, 309, and 310 effect a circular left shift of the 31 rightmost bits of the variable reg by seven bits. (Since the variable reg was initialized to zero, the circular left shift has no effect the first time blocks 306 through 310 are executed.) Then in block 311, an exclusive-OR combination is formed of the variable reg with the random number at the location of the random number table defined by the first character or byte of the key. In block 312, a determination is made as to whether there are more bytes of the key yet to be processed. Since, at this point only one byte has been processed, execution proceeds to block 313, where the second byte of the key is accessed and the sequence of blocks 306 through 311 is repeated. Again a circular left shift by seven bits is performed on the 31 rightmost bits of the variable reg. In block 311, an exclusive-OR combination is formed of the variable reg with the random number at the location of the random number table defined by the second byte of the key. The process is iterated for each of the 15 bytes of the key. After the last byte has been processed, execution proceeds from block 312 to block 314 where the contents of the variable reg are added to the variable lfoldbit. Execution proceeds to decision block 314 where it is determined whether there are more keys yet to be processed. Consistent with the present example of a single key, execution proceeds to block 316 where the sign bit of the variable lfoldbit is masked. Then in block 317, the variable lfoldbit is copied to a memory address defined by a pointer variable addrfoldbit. Finally the variable addrfoldbit is returned in block 318 as the pointer to the location where the result is stored The program of FIG. 3 also includes provision for handling multiple keys and keys comprising a single character or byte. In the case of single-byte keys, execution proceed from decision block 303 to block 318, where the key is simply added into the variable lfoldbit. Multiple keys are processed by branching from decision block 314 to block 319, where the next key is obtained, and then repeating the above-described process beginning with block 303. The program listing for the program of FIG. 3 coded using the well-known C programming language is given in Appendix A.

It is important to note that the same result is obtained whether all 15 random numbers are selected first and then combined as in the flow chart of FIG. 2, or each random number is in turn selected and then combined with the contents of the variable reg as in the flow chart of FIG. 3.

As discussed above, the result obtained by the program of FIG. 3 is then used to derive the database address both to initially store the tuple including the character string on disk 105, and to subsequently retrieve the tuple. In the present example, the relation is stored on disk 105 on M1 pages each comprising space for M2 tuples per page, where M1 and M2 are engineered quantities. If the result of execution of the program of FIG. 3 for a particular character string is denoted by R, the tuple including the character string is stored on page R mod M1 at location R mod M2, where R mod M1 is the remainder of the division of R by M1 and R mod M2 is the remainder of the division of R by M2. If the derived database address is being used to store another tuple, a linear probing of the other addresses on that page is effected and the next available address on the page is used (including returning to the beginning of the page if necessary). If the derived database address defines a page which is completely filled with other tuples, the next tuple is stored on an overflow page.

The exemplary data hashing arrangement described above has been used to store 100,074 tuples on disk 105 at a packing density of 73% with only one tuple being stored in overflow. Reducing the packing density to 69% resulted in no tuples being stored in overflow.

Figure 4:
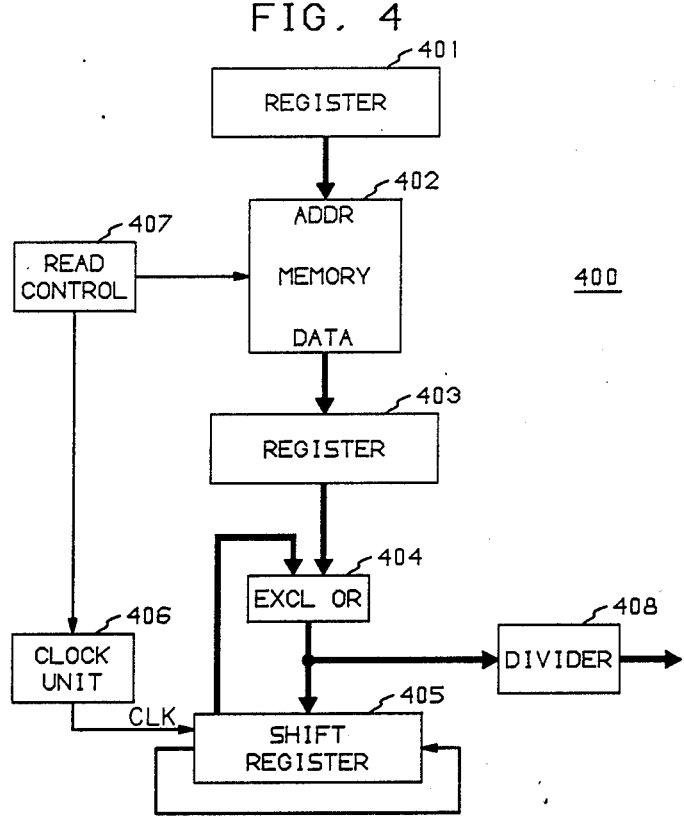
FIG. 4 is a block diagram of a database address generation apparatus implementing the exemplary data hashing method.

FIG. 4 is a block diagram of a database address generator 400 implementing the above-described data hashing method for generating a database address from an N-byte key, where N is a positive integer greater than one. In the present example, N is 15. Generator 400 includes a register 401, which stores the 15-byte key, and further includes a memory 402 used to store the table of 31-bit random numbers of Appendix A. Register 401 transmits the first byte of the key to an ADDRESS input port of memory 402. A read control unit 407 first effects a seven-bit circular left shift operation on the contents of a 31-bit circulating shift register 405 by transmitting seven clock pulses thereto. Read control unit 407 then effects the reading of a 31-bit random number from memory 402 at the addressed location defined by the byte from register 401. The random number is stored in a 31-bit register 403. An exclusive-OR unit 404 then performs an exclusive-OR combination of the contents of register 403 and shift register 405 and overwrites the result back into shift register 405. The procedure is repeated for each of the 15 bytes of the key. A divider unit 408 then derives the database address as a function of the result formed in shift register 405. In the present embodiment, divider 408 generates the page of disk 105 (FIG. 1) according to R mod M1 and the location on that page according to R mod M2, where R is the result formed shift register 405, M1 is the total number of pages available for storage, and M2 is the number of tuples that can be stored per page.

Churm-Diesel 1-2

APPENDIX A

APPENDIX_A

```
/*
 *
 * Function:
 * DB7foldkey
 *
 * Description:
 *      This function folds a key into a 32 bit (long) unsigned
 *      variable, which is used by hash access. Characters are
 *      folded byte by byte to allow every byte a chance to set
 *      any bit in the result. For each byte in the key, the 31
 *      bit register (reg) is shifted left circular 7 bits; A
 *      random number is then added to reg based on the byte in
 *      the key.  Finally, reg is added to lfoldbit which holds
 *      the temporary value of the folded key.
 *      The only two descriptor types supported
 *      by this function are DBSHORT and DBARRAY.
 *
 *      Parameters:
 *              buf - pointer to user buffer
 *,             numdesc - number of descriptors
 *              dt_desc - pointer to descriptor dictionary
 *              addrfoldbit - pointer to folded key to be returned
 *
 *      Return Codes:
 *              DBSYS_ERR
 *              GLSUCCESS
 */ define SHIFT  7 /* number of bits to shift between bytes */

/*table of 31 bit random numbers, 1/ascii character to be used in
 * folding algorithm */ long DBrand[256] = {    /* table of 31 bit random numbers, 1/ascii character */
            0x32bf5b92,    /* ascii character 0x00 */
            0x6b95064b,    /*                 0x01 */
            0x2d3a1e03,    /*                 etc. */
            0x3929a55f,
            0x28caecbd,
            0x71767ca5,
            0x01fe9e6a,
            0x4ac377e5,
            0x146630ef,
            0x311d9a0e,
```

0x5872d4d0,
0x0788b05a,
0x732e6d08,
0x14ef12de,
0x145c747a,
0x443b76ec,
0x4d5498c8,
0x4a95e1ab,
0x228e69e1,
0x31fb3083,
0x258e265e,
0x5f06390c,
0x2636164a,
0x09ab3b54,
0x33d6788f,
0x6dbe8f78,
0x78926b03,
0x54d7a293,
0x6c59517f,
0x005a474c,
0x3b2f3e3b,
0x442c1b45,
0x64d92420,
0x21ff94eb,
0x7dcad37f,
0x2744bc33,
0x4ce8d234,
0x4dea64ff,
0x1b3131cd,
0x716502fa,
0x26ff0100,
0x137024de,
0x2b388156,
0x3198d840,
0x5261ce8f,
0x60746f09,
0x4d434ad5,
0x440c6501,
0x3acc519f,
0x5384bdce,
0x29e11287,
0x7922ab07,
0x2f1bee2d,
0x78d1660d,
0x00f368c6,
0x421ff278,
0x22ea2898,
0x031c3c17,
0x4bc52a46,
0x1a3c3e89,
0x70584174,
0x079964b2,
0x216349ea,
0x26c31b51,
0x721c83ee,
0x3fc4f439,
0x5ae21e44,
0x24a936b8,
0x6eb5d0d7,
0x56781de0,
0x3aafcca8,
0x7ad5568e,
0x6328904f,
0x3032d516,
0x1d440beb,
0x2d615db8,
0x2670d40f, 0x55bae303,
0x5c0718bd,
0x48713284,
0x69881452,
0x31ff9231,
0x68cd55a0,
0x6c08781e,
0x17199161,
0x78c13246,
0x3662b084,
0x42a52d1c,
0x086703ba,
0x74edd5ef,
0x70f88801,
0x61746134,
0x330fe4dc,
0x5818ccd9,
0x617a6a30,
0x33d7540d,
0x10083ab2,
0x3e087bd9,
0x1c79a727,
0x6fc26f32,
0x43b06f99,
0x002e552c,
0x6e25510f,
0x0264ad23,
0x684e6110,
0x1f16d2d8,
0x2843e3e3,
0x7b9d1f86,
0x77c06efb,
0x679b7531,
0x3efd6ec6,
0x1c2d667b,
0x49c5f594,
0x24fee777,
0x2918b901,
0x21730b0d,
0x16453bef,
0x003b8c9d,
0x05bb7c99,
0x1edecec4,
0x352d8127,
0x59ced625,
0x1c657089,
0x40802257,
0x0894722a,
0x324fe726,
0x3d5f7ca1,
0x1bec157e,
0x1c18f21e,
0x7546256f,
0x2cd410fb,
0x18aa31e6,
0x1b09bf6f,
0x511c7ac6,
0x06db3b15,
0x6446d33e,
0x03ed1f77,
0x38d82849,
0x1694b290,
0x7751ae6e,
0x746f5ac8,
0x3c862df6,
0x6f93b784,
0x590859e8,

```
0x77107419,
0x3a406846,
0x33043c7e,
0x7257c916,
0x58c623ca,
0x6b5ba5f3,
0x5eae7617,
0x535cccf3,
0x56cdc215,
0x49e217db,
0x22f58a32,
0x77bacbb6,
0x54ba69d3,
0x06119cfd,
0x2bfb8d1,
0x4f2101a8,
0x13063de8,
0x304b8ca0,
0x5281f894,
0x0349bd17,
0x6bb25b4d,
0x09dbc092,
0x5f0ea0d0,
0x20c42763,
0x736fa1b8,
0x3056c18e,
0x28e65b48,
0x1b104d35,
0x53031cea,
0x202b17b7,
0x1d44378b,
0x201e37d0,
0x78bb7895,
0x117fe141,
0x229159ea,
0x463c097f,
0x297988e7,
0x6ebaf12f,
0x25fa6013,
0x570c2f2e,
0x6aa491b7,
0x702ad836,
0x5328354e,
0x095bd915,
0x7303964b,
0x207559c1,
0x4e3fb054,
0x6bc30c8f,
0x6a7f9bc4,
0x2fb0ef0e,
0x60e6f4c7,
0x0dfac109,
0x6ce76827,
0x47981a75,
0x6dc53253,
0x2bea9a15,
0x588be808,
0x2c2f6cc9,
0x7260fb5f,
0x7ab6f09e,
0x0f9504d5,
0x7da33ed7,
0x070b0d6f,
0x4eb0fd36,
0x04e155bc,
0x3030410c,
0x43470519,
```

```
        0x2416158c,
        0x47bfb53a,
        0x4dba2333,
        0x688117a1,
        0x39280ef9,
        0x03786541,
        0x3c65b65b,
        0x24778c34,
        0x2577f839,
        0x190c0c05,
        0x02400ad6,
        0x6a304ebe,
        0x495d7c37,
        0x0d697364,
        0x5dd22c5e,
        0x0f3e9668,
        0x1ca86000,
        0x793f94f0,
        0x5e993e53,
        0x692239b1,
        0x69beadda,
        0x20201c9a,
        0x20d4da20,
        0x2b49ea28,
        0x31b13f6e,
        0x437f2bfc,
        0x2219b1bb,
        0x335b31c3,
        0x6f797920,
        0x05dfc842,
        0x25b4984a,
        0x3276abdf,
        0x47ae287f,
        0x27c8fcb6,
        0x694a32e3,
        0x3cdc93d5,
        0x0baa97d8,
        0x21965be8,
        0x7561b36c,
        0x7d3d6335,
        0x2a8208e5,
        0x73772976,
        0x1ecd1fa1,
        0x2fc3d9a2,
        0x604ae8a3};

short
DB7foldkey(buf, numdesc, dt_desc, addrfoldbit)
char *buf;
short numdesc;
struct rlDB_DSC dt_desc[];
unsigned long * addrfoldbit;
{
        unsigned long reg;   /* holds intermediate value of folded key */
        unsigned long tempreg; /* storage for shifted reg value*/
        unsigned long lfoldbit; /* holds temporary value of folded key */
        unsigned short indx; /* hex value of key character */
        char *byte_num; /* pointer to key char position in buffer */
        short i;      /* counter */
        char *itemlen; /* pointer to position of last key character */ lfoldbit = 0;
        for (i=0; i < numdesc; i++) {
                switch(dt_desc[i].type) {
                        case DBSHORT:
                            lfoldbit += *(unsigned short *)(buf+dt_desc[i].byte_off +
                                    (dt_desc[i].bit_off >> 3));
                            break;
```

```
            case DBARRAY:
                reg = 0;
                /* set byte_num to beginning of key array */
                byte_num = buf+dt_desc[i].byte_off +
                                (dt_desc[i].bit_off >> 3);
                itemlen = byte_num + dt_desc[i].length - 1;
                /* determine length of key */
                while (*itemlen == ' ' && itemlen != byte_num)
                    itemlen--;
                /* process key byte by byte */
                for (; byte_num<=itemlen; byte_num++) {
                    /* indx used to index into
                        table of random numbers */
                        indx = *byte_num;
                        tempreg = reg >> (31-SHIFT);
                        reg <<= SHIFT;
                        /* turn off high order sign bit */
                        reg &= 0x7fffffff;
                        reg |= tempreg;

reg ^= DBrand[indx];
                }
                lfoldbit += reg;
                break;

default:
                AUASRTA(AUFALSE, DBAC0016);
                return(DBSYS_ERR);
        }
    }
    /* turn off high order (sign) bit */
    lfoldbit &= 0x7fffffff;
    *addrfoldbit=lfoldbit;
    return(GLSUCCESS);
}
```

What is claimed is:

1. In a computer system including a database, a hashing method for accessing a data item in said database, said data item comprising N data units, N being a positive integer greater than one, said method comprising the steps of selecting random numbers from a predefined table of random numbers at locations of said table each determined from a different one of said N data units, wherein each of said selected numbers comprises a plurality of bits, each of said data units comprises a plurality of bits, and each of said selected numbers comprises more bits than any of said data units, combining said selected numbers to form a hashing result, wherein said combining step comprises:

(A) initializing a register for storing a plurality of bits, (B) reordering said bits in said register, (C) generating a combination of one of said selected numbers with bits in said register, (D) storing said combination in said register, and (E) repeating steps (B), (C), and (D) for other ones of said selected numbers to form said hashing result in said register, said method further comprising the steps of deriving a database address as a predetermined function of said hashing result, and accessing said data item in said database using said derived database address.

2. A method in accordance with claim 1 wherein said reordering step comprises performing a circular shift operation on bits in said register.

3. A method in accordance with claim 2 wherein said combination comprises an exclusive-OR combination.

4. A method in accordance with claim 1 wherein said combination comprises an exclusive-OR combination.

5. A method in accordance with claim 1 wherein said deriving step comprises deriving said database address from said result as a remainder of a division of said result by a positive integer greater than one.

6. A method in accordance with claim 1 wherein said derived database address identifies a database location and wherein said step of accessing said data item comprises determining whether said data item is stored at said database location identified by said derived database address, and upon determining that said data item is stored at said database location, accessing said data item at said database location.

7. A method in accordance with claim 1, wherein said derived database address identifies one of a plurality of sequential database locations and wherein said step of accessing said data item comprises determining whether said data item is stored at said one database location identified by said derived database address, upon determining that said data item is not stored at said one database location, examining subsequent ones of said plurality of database locations, determining that said data item is stored at one of said subsequent database locations, and accessing said data item at said one subsequent database location.

8. Apparatus for accessing a data item in a database, said data item comprising N data units, N being a positive integer greater than one, said apparatus comprising means for storing a predefined table of random numbers, wherein each of said random numbers comprises a plurality of bits, means for selecting random numbers from said storing means at locations of said storing means each determined from a different one of said N data units, wherein each of said data units comprises a plurality of bits, each of said selected random numbers comprises a plurality of bits, and each of said selected random numbers comprises more bits than any of said data units, means for combining random numbers selected from said storing means to form a hashing result, wherein said combining means comprises register means for storing a plurality of bits and means responsive to each random number selected by said selecting means for generating a combination of said each selected random number with bits in said register means and overwriting the generated combination into said register means, where said hashing result is formed in said register means after N random numbers have been selected by said selecting means and N generated combinations have been overwritten into said register means, said apparatus further comprising means for deriving a database address as a predetermined function of said hashing result, and means for accessing said data item in said database using said database address.

9. Apparatus in accordance with claim 8 further comprising means for reordering bits in said register means.

10. Apparatus in accordance with claim 9 wherein said reordering means comprises means for performing a circular shift operation on bits in said register means.

* * * * *